(12) United States Patent
Smith

(10) Patent No.: US 8,176,724 B2
(45) Date of Patent: May 15, 2012

(54) HYBRID BRAYTON CYCLE WITH SOLID FUEL FIRING

(76) Inventor: Douglas W. P. Smith, Port Coquitlam (CA)

( * ) Notice: Subject to any disclaimer, the term of this patent is extended or adjusted under 35 U.S.C. 154(b) by 767 days.

(21) Appl. No.: 12/284,226

(22) Filed: Sep. 18, 2008

(65) Prior Publication Data

US 2010/0064688 A1 Mar. 18, 2010

(51) Int. Cl.
- F02C 7/00 (2006.01)
- F02C 1/04 (2006.01)
- F02G 1/00 (2006.01)
- F02G 3/00 (2006.01)
- F01K 25/02 (2006.01)

(52) U.S. Cl. .............................. 60/39.53; 60/683; 60/684

(58) Field of Classification Search .................. 60/39.53, 60/39.59, 39.6, 650, 655, 682–684
See application file for complete search history.

(56) References Cited

U.S. PATENT DOCUMENTS

| | | | | |
|---|---|---|---|---|
| 2,404,938 A | * | 7/1946 | Armacost et al. | 60/683 |
| 2,434,950 A | * | 1/1948 | Nettel et al. | 60/683 |
| 2,869,324 A | | 1/1959 | Foote | |
| 3,995,431 A | * | 12/1976 | Schwartzman | 60/684 |
| 4,829,763 A | | 5/1989 | Rao | |
| 5,165,239 A | * | 11/1992 | Bechtel et al. | 60/683 |
| 5,778,675 A | * | 7/1998 | Nakhamkin | 60/652 |

OTHER PUBLICATIONS

Jonsson, Maria, Advanced Power Cycles with Mixtures as the Working Fluid, 2003, Department of Chemical Engineering and Technology, Royal Institute of Technology SE-100 44 Stockholm, Sweden; See p. 38¶2; pp. 39-50, §4.2.
Wolf, J; Barone, F; Yan, J: Analysis of Evaporative Biomass Air Turbine Cycle With Gasification for Topping Combustion, 2002, J. Eng. Gas Turbines Power, vol. 124, pp. 757-751.

* cited by examiner

Primary Examiner — Thomas Denion
Assistant Examiner — Christopher Jetton
(74) Attorney, Agent, or Firm — Laurence C. Bonar

(57) ABSTRACT

This invention provides a method of converting heat energy to a more usable form using an externally-heated Brayton cycle. Atmospheric air is used with water injection in a thermodynamic cycle that includes compression (1), evaporative cooling (34), recuperative heating (8), evaporative cooling (36), external heating (9) and expansion through a turbine (2). Power capacity and overall efficiency are maximized by decreasing the temperature of working fluid entering recuperator (8) and heater (9) while increasing the mass flow through turbine (2). Overall efficiency during turndown is maximized using a portion of low-pressure working fluid from the turbine in a three-chamber combustor wherein volume flow into the first chamber containing solid fuel determines the system energy, volume flow into the second chamber combines with partially combusted gases from the first chamber to achieve the optimum combustion temperature and volume flow into the third chamber blends with combustion gases from the second chamber to limit the hot gas to the maximum temperature allowed by the system equipment.

11 Claims, 9 Drawing Sheets

HYBRID BRAYTON CYCLE WITH SOLID FUEL FIRING

TECHNICAL FIELD OF THE INVENTION

This invention relates to the field of power generation by applying the thermodynamic power cycle known as the Brayton cycle, as used in gas turbines and jet engines, in an externally-heated configuration.

BACKGROUND OF THE INVENTION

Over the years a number of individuals and companies have proposed applying the Brayton-cycle in an externally-heated arrangement. (For example, Wolf, J., F. Barone and J. Yan, Performance Analysis of Evaporative Biomass Air Turbine Cycle With Gasification for Topping Combustion, Journal of Engineering for Gas Turbines and Power, Vol. 124 p. 757, 2002; Jonsson, Maria, Advanced Power Cycles with Mixtures as the Working Fluid, Doctoral Thesis, Department of Chemical Engineering and Technology, Energy Processes, Royal Institute of Technology, Stockholm, Sweden, 2003; UK Department of Trade and Industry reports URN Number 02/1346, Biomass Combustion Gas Turbine CHP, 2002. and URN Number: 05/698, Biomass Fuelled Indirect Fired Micro Turbine, 2005) Most attempts have never reached public demonstration. The few such systems that have been produced have failed to show power and efficiency levels to justify themselves economically. It is likely that many proponents, before investing in equipment, have analyzed the externally-heated Brayton cycle to determine its shortcomings and have chosen to not invest. Others have used testing to discover the limitations and may or may not understand the technical reasons for them. This inventor has used computer simulations to analyze several power generating systems useable for electrical generation employing the externally-heated Brayton cycle, and has compared them to a typical internally-heated Brayton system to clarify the limitations, defined a hybrid Brayton cycle that overcomes most of the limitations described and developed an integrated combustion control to bring flexibility to this invention.

The Brayton cycle is the thermodynamic approach used to construct gas turbines and jet engines. Brayton cycle systems are typically implemented using air as the working fluid in an "open loop" configuration to simplify equipment requirements. This means that the atmosphere, at its existing thermodynamic conditions of temperature, pressure and humidity level, serves as the source of working fluid and that the working fluid exhaust of the power cycle is released back into the atmosphere. In practical terms, the atmosphere acts as a sufficiently large reservoir to ensure rejected heat does not affect the thermodynamic conditions at the inlet to the power cycle.

A typical Brayton cycle is used in an internally-heated configuration. A power system using the internally-heated Brayton cycle will compress air taken from the atmosphere, inject a fuel into this compressed working fluid, ignite and burn the mixture to greatly increase its temperature (and internal energy) then expand it through a turbine to produce work. With internal energy added to the working fluid by the combustion process, the expansion through the turbine will generate more energy than has been used to compress it originally. The energy required for compressing the working fluid is taken from the turbine and the excess turbine energy is output as useful work.

Work efficiency of the Brayton cycle is the percent of energy input into the cycle that is outputted as work by the turbine. Said work efficiency is directly related to the pressure ratio of expansion and the temperature entering the turbine. Practical equipment is limited in the pressure ratio that can be efficiently used across a single stage of expansion and similarly across a single stage of compression. Multiple stages of expansion are often used to maximize efficiency of producing useful work but at the expense of higher complexity and cost. Higher temperatures entering the turbine increases the work produced but requires greater fuel flow rates to obtain.

Temperatures used to obtain high turbine efficiencies are easily above typical metal operating limitations. It becomes necessary to cool the metal encasing the combustion area of the Brayton system as well as the turbine blades themselves. Keeping the combustion section small and close to the turbine allows the metal to be cooled from the outside without excessive energy loss.

Almost all of the energy that isn't converted to work by the turbine remains in the working fluid (air) expelled. The exhaust temperature of a typical Brayton cycle power system is high. This unused energy is seldom recovered within in larger systems because the size of the heat exchanger, external piping and pressure losses would not justify the efficiency benefit realized. However simplified, single-stage, low-power turbine systems have been developed using a built-in recuperator to sufficiently enhance their efficiency to make them commercially viable. Such small systems have been termed microturbines and generally range from 30 kWe to over 250 kWe.

FIG. 1, "Example Single-stage Microturbine with Recuperator", shows a simple internally heated Brayton cycle system for electric power generation. Available information on such systems indicate that a system operating at a compression ratio of about 5 with and an output temperature (28) of 590° F. (310° C.) would have an approximate work efficiency of 28%. This example system of FIG. 1 is designed for internal combustion of a gaseous fuel (32) such as natural gas or propane. Compressor (1) would output pressurized air (12) at about 450° F. (230° C.) while turbine (2) would operate with inlet heated air (16) temperature of 1650° F. (900° C.) and turbine exhaust (22) temperature of 1050° F. (565° C.).

Combustor (7), used in the system of FIG. 1 to add fuel input energy (32) to working fluid (12) before turbine (2), can be replaced by heat exchanger (9) to create a "Simple Externally-heated Brayton Cycle with Independent Heat Source" as depicted in FIG. 2. A power system using this approach will compress air (10) taken from the atmosphere, pipe it through external heat exchanger (9) to transfer heat from an external high temperature energy source (27) then expand it through turbine (2) to produce work (4). The externally-heated Brayton cycle has the advantage that combustion products are not passed through the turbine which allows waste heat, solid fuels or "dirty" fuels to be used as the energy source. Renewable energy resources are often solid fuels available in quantities most suited to the small scale of microturbine equipment.

FIG. 2 represents the basic arrangement of a "Simple Externally-heated Brayton Cycle with Independent Heat Source". Disadvantages to such externally-heated Brayton systems, described in greater detail below, include lower mass flow through the turbine, additional pressure drops, reduced temperature due to heat exchanger energy transfer and further reduction in temperature to accommodate metal temperature limitations.

Reduced mass flow of heated air (16) passing through turbine (2) results in a loss of power when converting from an internally-heated to an externally-heated Brayton cycle. The mass of fuel input (32) in the internally-heated system of FIG.

1 is added, in the form of combustion products, to the mass of air (10) that has been pressurized by compressor (1) before total mass flow (16) is passed through turbine (2). Fuel input (32) may represent only ½ percent of total mass flow (16) through turbine (2) but since parasitic power from turbine (2) used to drive compressor (1) can represent ⅔ of the power that turbine (2) produces then ½ percent loss of mass flow (16) may represent 1½ percent loss of work output (4).

Pressure losses detract from the work efficiency of any Brayton cycle system. A practical reality for the externally-heated Brayton cycle is the pressure loss related to the external heat exchanger and associated piping. However these losses can be calculated and predicted as well as be minimized by using large diameters and low velocities.

A heat exchanger separates two fluids physically while allowing heat to transfer from the hot fluid to the cooler fluid with the minimum temperature difference between the two fluids, at any point within the exchanger, referred to as the pinch temperature. A temperature difference must be maintained in any heat exchanger to ensure that heat flows from the energy source to the energy receiver; e.g. from flue gas (27) to pressurized air (12) in FIG. 2. Using the same volume flow of working fluid air (10) and the same energy in the form of fuel input (32), it is readily apparent that the combustion temperature will not exceed that of the internally-heated Brayton system. The required temperature drop in heater (9) from flue gas (27) to heated air (16) ensures that a lower temperature of working fluid (16) will enter turbine (2) and turbine work (4) will be reduced. Thus the same energy input to the system results in reduced work output by the turbine which means the efficiency of an externally-heated Brayton cycle will be less than the efficiency of an internally-heated Brayton cycle. Moreover the effect of the reduced work output of the turbine is more pronounced on the overall system since the required compressor energy remains unchanged and is taken directly from the turbine work.

Metal temperature limitations introduce an additional loss of efficiency in a practical externally-heated Brayton cycle system. Materials used in piping to and from the heat exchanger as well as tubing in the heat exchanger must be rated for the pressure of the working fluid. Available metals for this service will typically restrict the allowable temperature of the heat source entering the heater. Attempts have been made to use non-metal exchangers and piping to increase the operating temperatures but it is a difficult and expensive proposition.

Therefore a practical, externally-heated Brayton cycle system will have a much reduced temperature of working fluid (16) entering turbine (2). The required energy for compressor (1) will not change and thus any loss of work by turbine (2) subtracts directly from useful work output (4). For an externally-heated Brayton cycle the combustion temperature is limited to meet material property needs and the working fluid temperature is lower still to accommodate heat transfer in the heater.

Operating responses of alternative systems as depicted in the accompanying figures have been prepared by computer simulation based on equilibrium analysis using the first and second law of thermodynamics. Computer models have assumed using the equipment components of the FIG. 1 system in the alternate arrangements of FIGS. 2, 2a, 3, 3a, 4, 5 and 7. Results have been compared to-data discussed above for said example system of FIG. 1. All computer simulations have used common input parameters of 100° F. (38° C.) for said pinch temperature of heater (9) at maximum power operation, 1450° F. (788° C.) for flue gas temperature (27) and 1450° F. (788° C.) for combustion gas temperature (26). Simulations have assumed control of the rotational speed of shaft (3) by externally controlling the loading applied to work output (4). Maximum power comparisons are made to the capacity of said example system of FIG. 1 using the equipment of FIG. 1 in its re-configured arrangement. In what follows, cycle efficiency refers to the portion of work output (4) compared to energy input to the power cycle through heater (9), and overall efficiency refers to the portion of work output (4) compared to the energy content of fuel input (32).

Thermodynamic analysis shows that operating equipment from said example of FIG. 1 in the configuration of FIG. 2 with said common input parameters and operating at a slightly lower rotational speed of shaft (3) for best efficiency results in said comparison maximum power production of 42.4% and overall efficiency of about 6.9%. Turbine exhaust (22) is 885° F. (474° C.) and represents energy rejected by the system. Cooled flue gas temperature (28) is 550° F. (288° C.) and represents energy remaining in the flue gas stream that never enters the thermodynamic cycle. The overall system efficiency will be less than the cycle efficiency.

FIG. 2a, "Recuperated Externally-heated Brayton Cycle with Independent Heat Source", indicates a scheme to use some of the heat in turbine exhaust (22) within the cycle. This method uses turbine exhaust (22) to heat pressurized air (12) exiting compressor (1) using recuperator (8). An externally-heated Brayton cycle that uses an independent heat source such as a waste heat stream has competing parameters that limit the benefits of recuperation.

Energy in turbine exhaust (22) can be transferred into pressurized air (12) in recuperator (8) before it enters heater (9). This keeps some of the energy rejected by turbine (2) within the cycle which increases the cycle efficiency of the externally-heated Brayton system. However recuperated air (14) is now at a higher temperature before entering heater (9) which means flue gas (27) cannot be cooled as much. The temperature of flue gas (28) exiting heater (9) will be higher in the arrangement of FIG. 2a than in the arrangement of FIG. 2 and less energy will be transferred within heater (9) in FIG. 2a. Thermodynamic analysis shows that this loss of energy entering the cycle will decrease the overall system efficiency thus working in opposition to the cycle efficiency increase due to recuperator (8). The result is that the reduction of heat transferred in heater (9) is almost equal to the gain in heat from recuperator (8). Although the cycle efficiency increased almost 1½ times, the total work output (4) did not change significantly and the overall system efficiency was virtually unchanged.

Thermodynamic analysis shows that operating equipment from said example of FIG. 1 in the configuration of FIG. 2a, "Recuperated Externally-heated Brayton Cycle with Independent Heat Source", with said common input parameters and operating at a slightly lower rotational speed of shaft (3) for best efficiency results in said comparison maximum power production of 43.5% and overall efficiency of about 7.1%. Turbine exhaust (22) is 878° F. (470° C.) and is cooled to 564° F. (296° C.) in recuperator (8). Cooled flue gas temperature (28) is 878° F. (470° C.) which is higher than the arrangement in FIG. 2. The overall system efficiency has only slightly increased.

FIG. 3, "Simple Externally-heated Brayton Cycle with Dependent Heat Source", describes an alternate method of energy recuperation applicable when the external energy source can be dependent and integrated with the Brayton system. This is the case when a fuel is being combusted specifically to supply energy to the Brayton system. Turbine exhaust (22) can be used to preheat air used within combustor (7) to burn fuel (32). Since turbine exhaust (22) is uncontaminated fresh air and holds the full original oxygen content, then it is most convenient and most efficient to use it directly in combustor (7). In this technique all of the energy content of turbine exhaust (22) is recuperated in combustor (7). Reasons for this approach include keeping combustion products out of turbine (2) which enhances blade and bearing reliability. It allows the use of solid fuels which cannot be easily pressurized nor burned in the internal combustion chamber of said example of FIG. 1. It also allows the use of "dirty fuels" that contain significant ash which, on an externally-heated Brayton system, never pass through turbine blades. Using waste heat or renewable fuels that otherwise go to waste means maximum work efficiency is less important than technology viability and cost-effectiveness.

For operation at less than full power capability, fuel input (32) is metered to determine work output rate (4). When using solid fuels in particular, combustor (7) may be multi-chambered so as to admit turbine exhaust (22) in separate chambers to affect optimum combustion. Chambers are functional, regions that may or may not be physically discrete but allow the substantially independent control of combustion conditions therein, such as the alternate implementations of the combustion and blending control as described herein. FIG. 3b Solid Fuel Combustor discloses an air distribution that may be used to optimize combustion at any power level. Underfire air (22a) feeds underfire chamber (7a) to initially gasify and partially combust input fuel (32). Combustion is completed in overfire chamber (7b) using sufficient overfire air (22b) to combust at the optimum high temperature. The balance of turbine exhaust (22) is introduced as blend air (22c) into blend chamber (7c) which reduces temperature of combustion gas (26) to match the material limit temperature of heater (9). At any selected fuel input rate (32) the total flow of turbine exhaust (22) must be controlled to maintain the temperature of combustion gas (26) and is done by affecting the speed of shaft (3) through loading. When work output rate (4) is electricity then the electrical interface will determine the attempted power draw as compared to the work output (4) available and create the loading which affects the speed of shaft (3).

Optimum combustion temperature is dependent on several factors. The higher the temperature, the more complete the combustion will be, and the more heat energy will be produced. However lower temperatures will prevent the formation of certain pollutants such as NOx. As used herein, "optimum temperature" shall mean the desired combustion temperature decided upon by the operator of the system, considering the tradeoffs involved.

Changes in power level demand require a change in fuel input rate (32) followed by adjustment of turbine exhaust (22) to maintain the temperature of combustion gas (26). Power can be decreased by reducing fuel input rate (32) which will reduce temperature of combustion gas (26) until shaft speed (3) slows which reduces compressor speed and hence volume of air (10) and allows the temperature of combustion gas (26) to increase and return to its set level.

Power can be increased by increasing fuel input rate (32) which will increase temperature of combustion gas (26) until shaft speed (3) increases which increases air (10) and allows the temperature of combustion gas (26) to decrease and return to its set level. To prevent excessive excursions of the temperature of combustion gas (26) above material temperature limits, the fuel input rate (32) must be increased slowly consistent with the response rate of the system. Alternatively the system may simultaneously increase fuel input rate (32) and reduce loading to allow shaft speed (3) to increase. This will create a reverse fluctuation in work load (4) during transition to a higher operating power level.

The externally-heated Brayton cycle in the arrangement of FIG. 3 has similar temperature limitations as those of arrangements in FIG. 2 and FIG. 2a. For the same fuel input rate (32) as used in said example of FIG. 1, the temperature of heated air (16) must be less for the arrangement of FIG. 3 than for the arrangement of said example of FIG. 1 due to the necessary temperature difference between combustion air (26) and heated air (16) in heater (9). The lower temperature of heated air (16) entering turbine (2) results in less work output (4) and thus lower system efficiency. A further temperature limitation for hot flue gas (16) is required to meet metal temperature restrictions of heater (9) which therefore restricts heated air temperature (16) further, reduces work output (4) and lowers system efficiency further. Since combustion gas (26) is not passed through turbine (2) there is less mass flowing through turbine (2) in the arrangement of FIG. 3 than in the arrangement of FIG. 1 and this also reduces work output (4).

Thermodynamic analysis of the system of shows that operating equipment from said example of FIG. 1 in the configuration of FIG. 3, "Simple Externally-heated Brayton Cycle with a Dependent Heat Source", with said common input parameters and operating at a slightly lower rotational speed of shaft (3) for best efficiency results in said comparison maximum power production of 43.3% and overall efficiency of about 12.3%. This is a better result than the arrangement of FIG. 2 and is due to recuperation associated with using turbine exhaust (22) for burning in combustor (7). Cooled flue gas (28) is 615° F. (324° C.) which is less than turbine exhaust temperature (22) of 875° F. (468° C.) and is an indicator of why the efficiency of FIG. 3 is higher than that of FIG. 2.

There are practical issues that arise in the operation of the FIG. 3 arrangement. The first issue is that the temperature of turbine exhaust (22) is very high for introduction into standard combustion equipment. A specially designed combustor (7) may be required. The second issue is the effects of operating at partial power levels. Lowering fuel input rate (32) while operating at the same rotational speed of shaft (3) will reduce the temperature of combustion gas (26) resulting in a reduced conversion efficiency of turbine (2). However slowing the rotational speed of shaft (3) will reduce air flow (10) to match fuel flow rate (32) and maintain combustion gas temperature (26) at its maximum limitation. This maximizes the conversion efficiency of turbine (2) and the overall system work efficiency at each energy input level. Operating at a lower rotational speed of shaft (3) also reduces the parasitic energy load that compressor (1) applies to turbine (2) which results in greater work output (4). The best overall efficiency during turndown will be obtained if 100% of turbine exhaust (22) is utilized as combustion air and the operating speed of shall (3) is controlled to maximize combustion gas temperature (26).

FIG. 3c is a graph of the power and efficiency of the FIG. 3 arrangement when operating at less than maximum power; turndown conditions. FIG. 3d is a graph of temperatures of the FIG. 3 arrangement during turndown conditions. FIG. 3c shows a reduction in overall efficiency at higher power levels and the maximum power level is limited well below 50%. The cycle efficiency actually increases with power level however higher temperature of pressurized air (12) entering heater (9) reduces energy transferred into the cycle. This temperature influence on heater (9) can be seen in the increasing temperature with power level of compressor outlet pressurized air (12) shown in FIG. (3d).

FIG. 3a displays a recuperated externally-heated Brayton cycle system operating with a dependent heat source. Recuperator (8) preheats pressurized air (12) before it is introduced to heater (9) and concurrently cools turbine exhaust (22) before it is introduced to combustor (7). The first advantage of the arrangement of FIG. 3a is that the temperature of cooled exhaust (24) introduced to combustor (7) is much lower than air introduced to combustor (7) of FIG. 3. This allows greater flexibility in equipment selection for combustor (7) allowing for more standard combustor designs to be used.

Thermodynamic analysis shows that operating equipment from said example of FIG. 1 in the configuration of FIG. 3a, "Recuperated Externally-heated Brayton Cycle With Dependent Heat Source", with said common input parameters and operating at a slightly lower rotational speed of shaft (3) for best efficiency results in said comparison maximum power production of 44.2% and overall efficiency of 8.6%. Cooled exhaust (24) entering combustor (7) is 565° F. (296° C.) which is greatly reduced from the FIG. 3 arrangement. For the same reasons as for the arrangement in FIG. 3, the best overall efficiency during turndown for the arrangement in FIG. 3a will be obtained if 100% of turbine exhaust (22), and thus 100% of cooled exhaust (24) is utilized in combustor (7) and the operating speed of shaft (3) is controlled to maximize combustion gas temperature (26).

It is significant to note that using the equipment of said example FIG. 1 the arrangements of FIG. 2, FIG. 2a, FIG. 3 and FIG. 3a can only produce less than half of their potential capacity. In addition, the overall efficiency has dropped dramatically. FIG. 6 is a chart to show the comparison of performance for the externally-heated Brayton systems. (Also included on this chart are the capabilities of this current invention depicted in FIG. 4 and FIG. 5). It can be seen that greatly limited maximum power and low electrical conversion efficiency are inherent shortcomings of the current state of the art of externally-heated Brayton systems.

BRIEF SUMMARY OF THE INVENTION

This patent application teaches a hybrid Brayton cycle system that overcomes the limitations of previously known externally-heated Brayton systems including the maximum power limitation and the overall efficiency losses inherent in such systems and further allows for a partial power control approach that overcomes the problem of slow system response times. The invention of the present patent application comprises adding water to the working fluid prior to entering recuperator (8) and prior to entering heater (9), with the result of evaporative cooling of the working fluid and increase in the mass of flow through turbine (2), more energy transferred in the heat exchangers and more overall energy converted to work output (4). The invention also comprises using only a portion of the flow of turbine output air (22) for combustion, which allows a new control approach such that faster response times and greater efficiency can be achieved.

The internally-heated Brayton cycle is based on energy-dependent fuel input. Referring to FIG. 1 it is noted that the energy of fuel input (32) increases the temperature of pressurized air (12) independent of the initial temperature of pressurized air (12). The internally-heated Brayton cycle is temperature independent. In contrast, heat exchangers in the externally-heated Brayton cycle are temperature dependent. The temperature rise of pressurized air (12) in heater (9) of FIG. 2 or recuperator (8) of FIG. 2a depends on the initial temperature of pressurized air (12). The temperature rise of recuperated air (14) in heater (9) of FIG. 2a depends on the initial temperature of recuperated air (14). It is also noted that in the system of FIG. 3 heated flow (16) entering turbine (2) has less mass than in FIG. 1 by the amount of fuel input (32).

Two different embodiments of the invention of the present application are illustrated in FIG. 4 (utilizing flue gas from an outside supply as the energy source) and FIG. 5 (employing an integral combustor for added fuel as the energy source).

Hybrid Brayton cycles of the present invention, shown in FIG. 4 and FIG. 5 mitigate both limiting features of the externally-heated Brayton cycle. Recuperator spray (34) cools pressurized air (12) due to evaporative cooling. A lower temperature and higher mass flow of cool pressurized fluid (13) (air plus water vapor) introduced into recuperator (8) allows more energy to transfer into recuperated air (14). Moisture spray (36) cools recuperated air (14) due to evaporative cooling. A lower temperature and higher mass flow of cool recuperated fluid (15) (air plus water vapor) introduced into heater (9) allows more energy to transfer into heated air (16). The added mass of recuperator spray (34) and heater spray (36) mitigates the mass loss of fuel input (32) of the internally-heated Brayton cycle of said example in FIG. 1.

BRIEF DESCRIPTION OF SEVERAL VIEWS OF THE DRAWING

FIG. 3b describes a three stage combustor of solid fuel applicable to use with the arrangements of FIG. 3 or FIG. 3a.

DETAILED DESCRIPTION OF THE INVENTION

Figure 1:
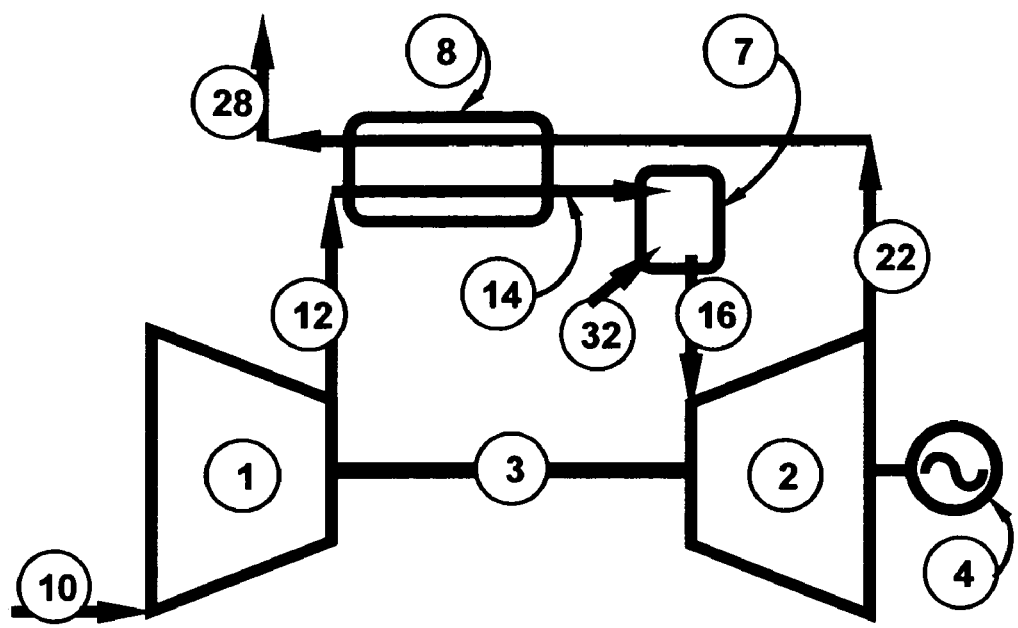
FIG. 1, "Example Single-stage Microturbine with Recuperator", describes the flow arrangement of an internally-heated Brayton cycle with recuperator used as the base example for this disclosure.
Figure 2:
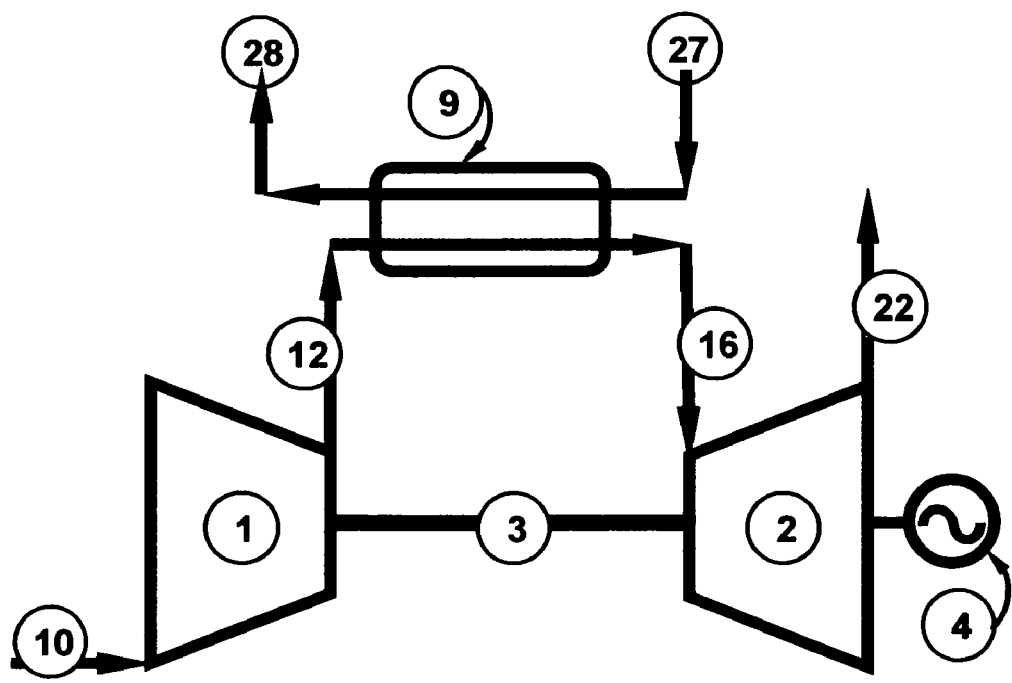
FIG. 2, "Simple Externally-heated Brayton Cycle With Independent Heat Source", describes the flow arrangement of an externally-heated Brayton cycle with an independent heat source.
Figure 2A:
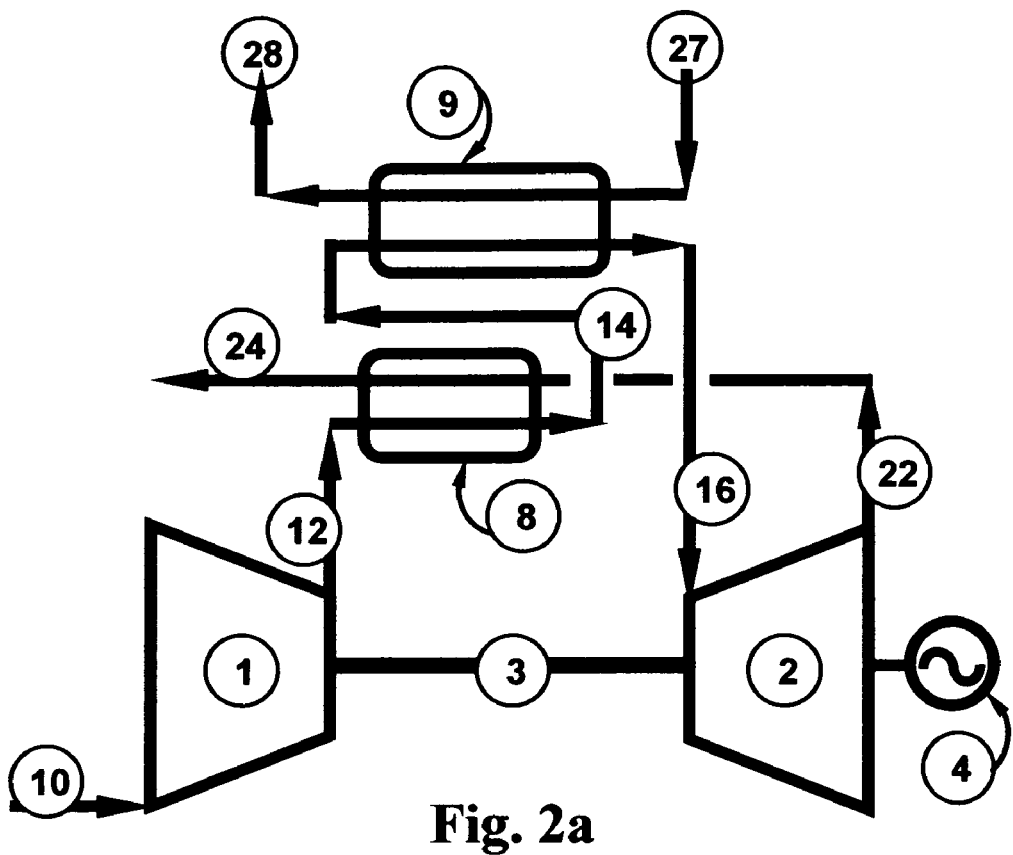
FIG. 2a, "Recuperated Externally-heated Brayton Cycle With Independent Heat Source", describes the flow arrangement of FIG. 2 with an added recuperator to preheat air (14) going into heater (9) and cool turbine exhaust (22) before exhausting it to the atmosphere.
Figure 3:
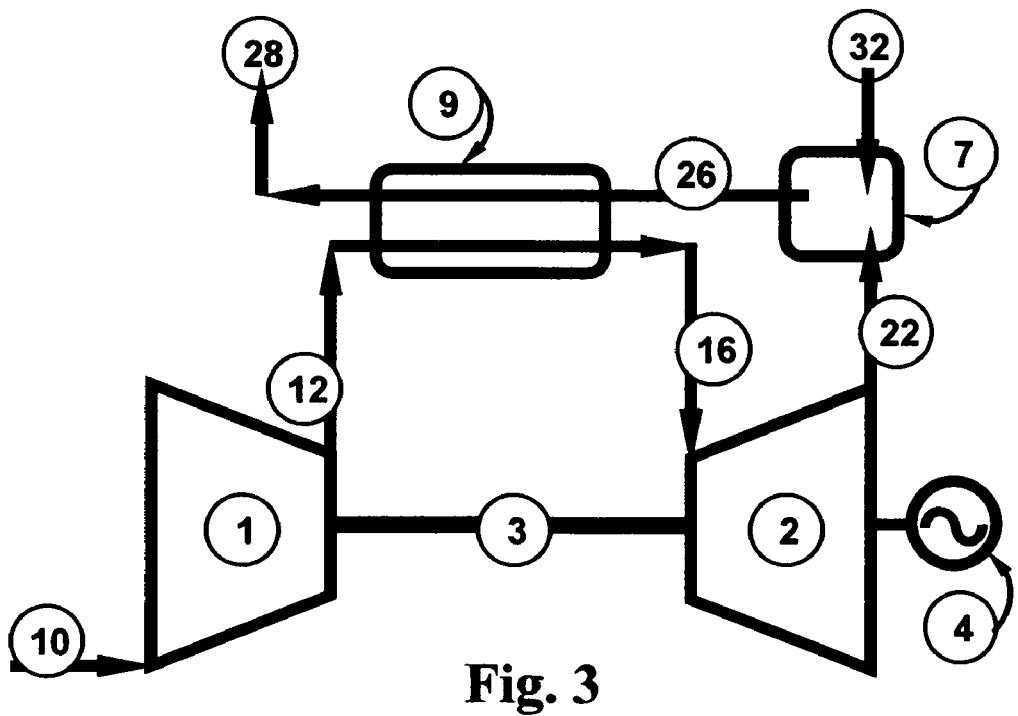
FIG. 3, "Simple Externally-heated Brayton Cycle With Dependent Heat Source", describes the flow arrangement of an externally-heated Brayton cycle with a heat source that uses turbine exhaust as combustion air.
Figure 3A:
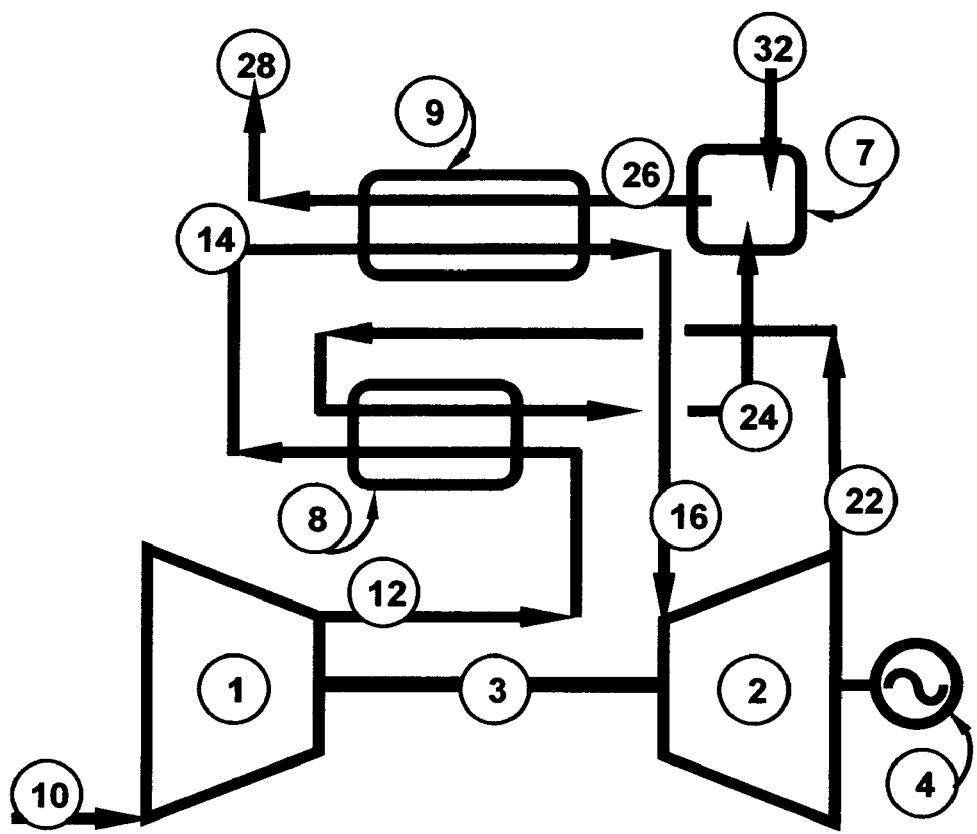
FIG. 3a, "Recuperated Externally-heated Brayton Cycle With Dependent Heat Source", describes the flow arrangement of FIG. 3 with an added recuperator to preheat air (14) going into heater (9) and cool turbine exhaust (22) before introducing it into combustor (7).
Figure 3B:
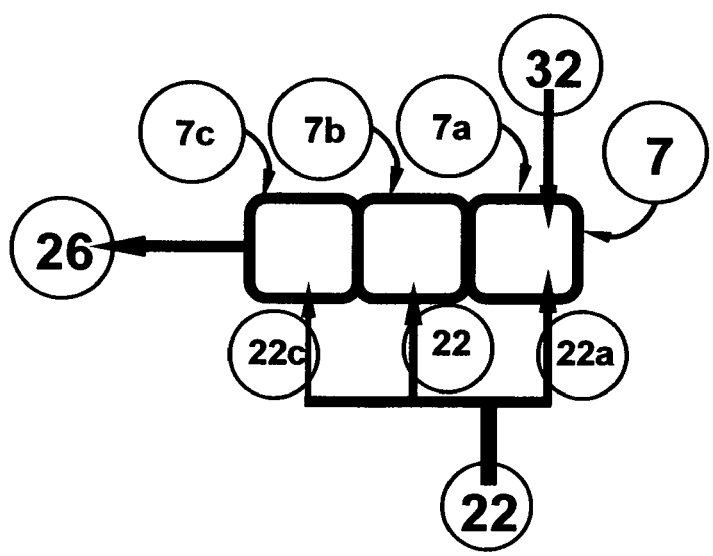
Figure 3C:
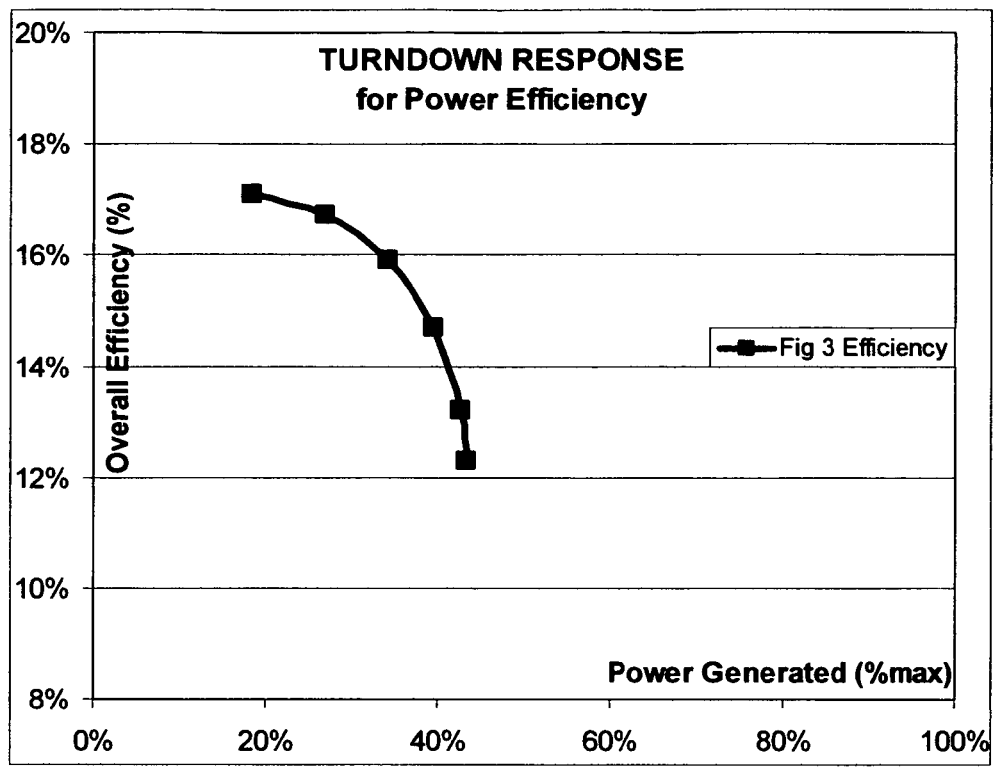
FIG. 3c is a graph of overall efficiency during turndown of the arrangement of FIG. 3.
Figure 3D:
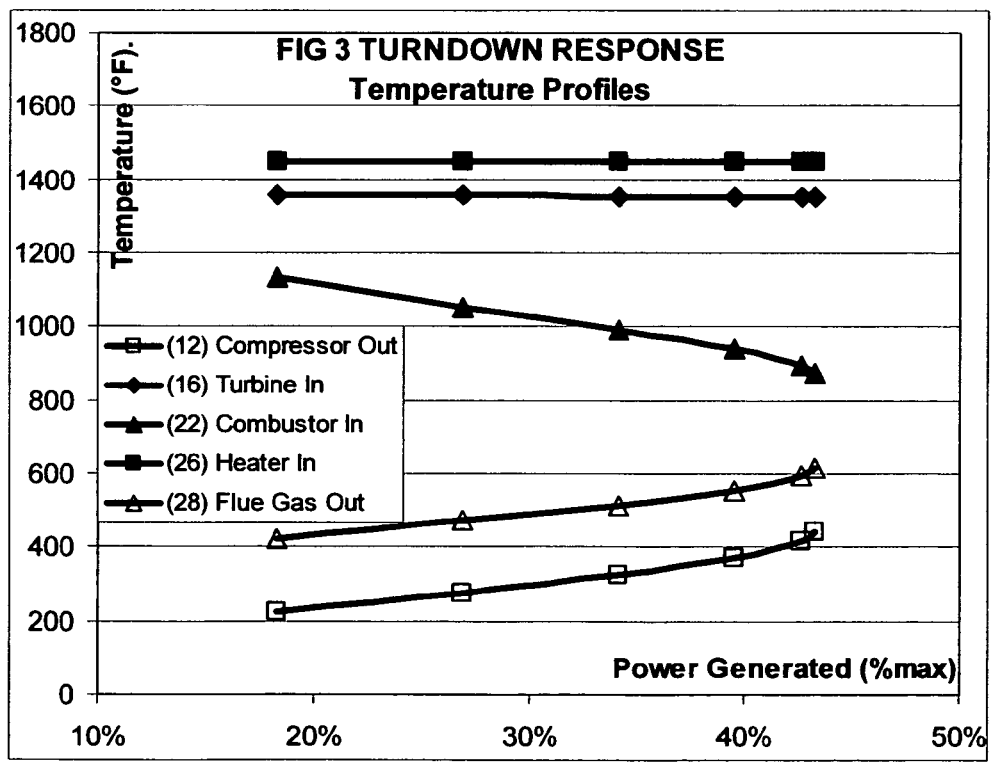
FIG. 3d is a graph of flow temperatures during turndown of the arrangement of FIG. 3.
Figure 4:
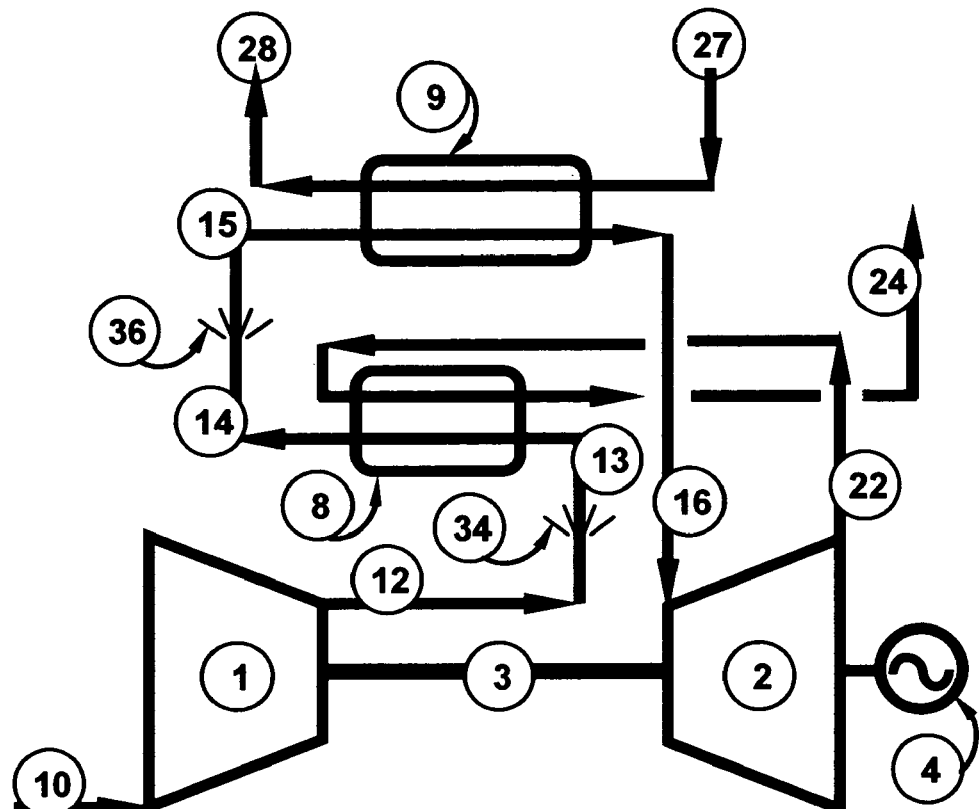
FIG. 4, "Recuperated Hybrid Brayton Cycle With Independent Heat Source", describes the flow arrangement of FIG. 3a with the modification of added sprays prior to the recuperator and prior to the heater.

Thermodynamic analysis shows that operating equipment from said example of FIG. 1 in the configuration of FIG. 4, "Recuperated Hybrid Brayton Cycle With Independent Heat Source", with said common input parameters and operating at a slightly lower rotational speed of shaft (3) for best efficiency results in said comparison maximum power production of 100% (equal to said example of FIG. 1) and overall efficiency about 16.3%. These results assumed a temperature for heater spray (36) and recuperator spray (34) of 60° F. (15.6° C.) and volume flow of each sufficient to generate 90% relative humidity downstream. Cooled exhaust (24) is 378° F. (192° C.), is clean with full oxygen content and is available as a source of heat or hot combustion air.

Figure 5:
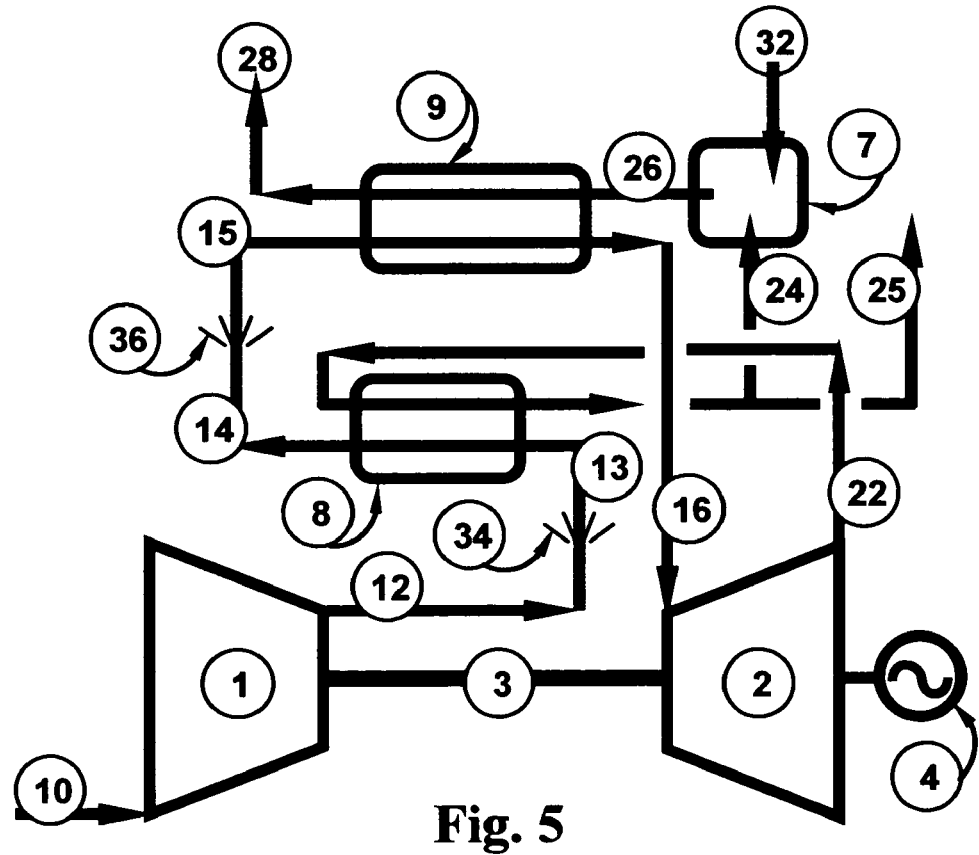
FIG. 5, "Recuperated Hybrid Brayton Cycle With Dependent Heat Source", describes the flow arrangement of FIG. 3a with the modification of added sprays prior to the recuperator and prior to the heater.

Thermodynamic analysis shows that operating equipment from said example of FIG. 1 in the configuration of FIG. 5, "Recuperated Hybrid Brayton Cycle With Dependent Heat Source", with said common input parameters and operating at a slightly lower rotational speed of shaft (3) for best efficiency results in said comparison maximum power production of 100% (equal to said example of FIG. 1) and overall efficiency about 18.2%. These results assumed a temperature for heater spray (36) and recuperator spray (36) of 60° F. (15.6° C.) and volume flow of each sufficient to generate 90% relative humidity downstream. Cooled exhaust (24) at 363° F. (184° C.) is the portion of turbine exhaust (22) fed to combustor (7). The balance of turbine exhaust (22) is output as bypass air (25), also at 363° F. (184° C.), clean with full oxygen content and available as a source of heat or hot combustion air for external use.

Figure 5A:
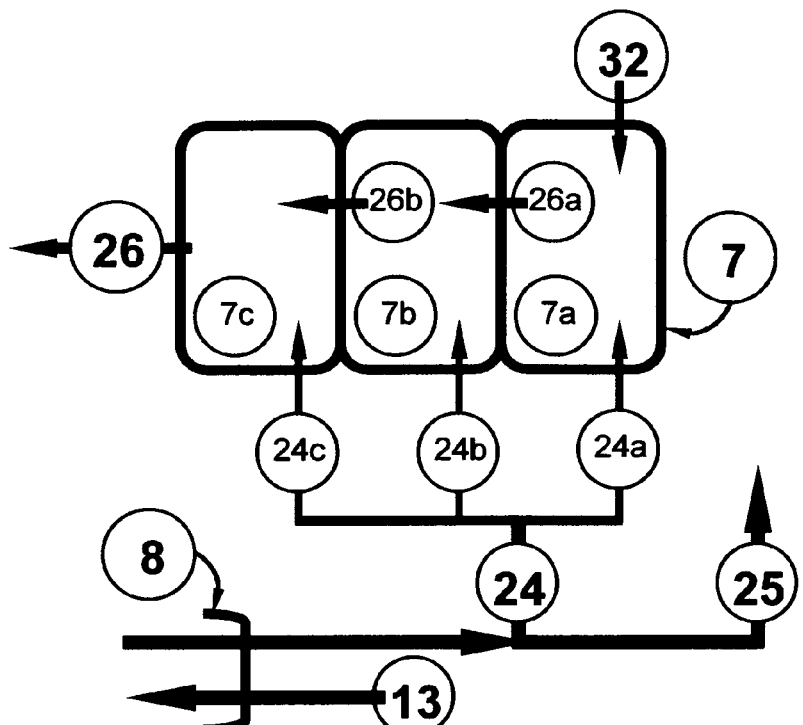
FIG. 5a describes a three stage combustor of solid fuel applicable to use with the arrangement of FIG. 5.
Figure 6:
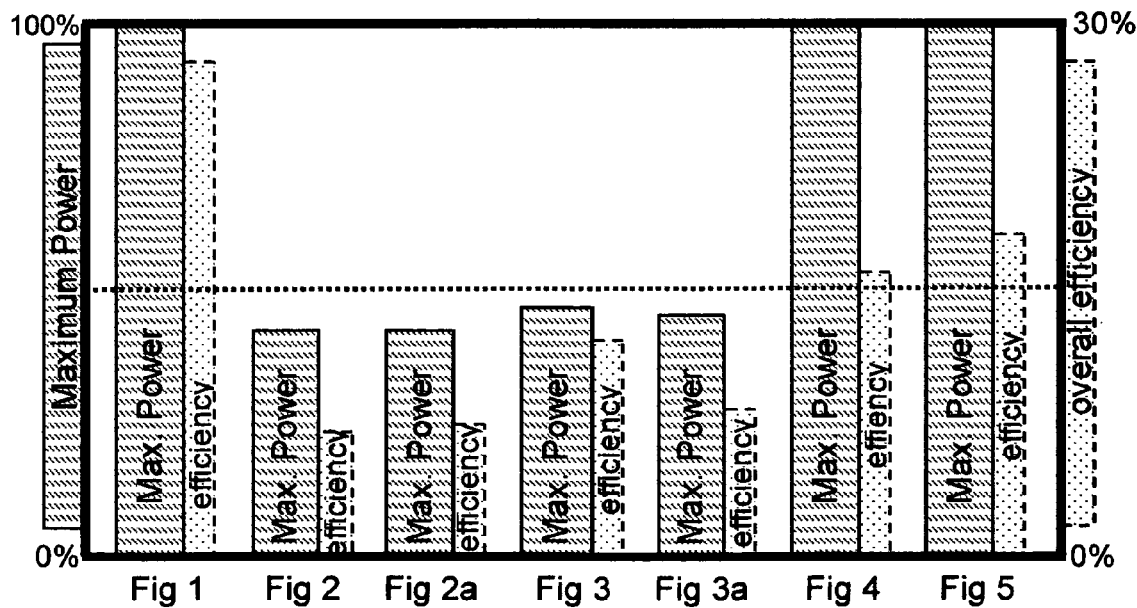
FIG. 6 is a chart comparing the maximum power production and overall efficiency of systems depicted in FIGS. 1, 2, 2a, 3, 3a, 4, 5.

The hybrid Brayton arrangement of FIG. 5 does not require all of turbine exhaust (22) be used in combustor (7) for operation at its optimum efficiency. As a consequence, this novel Brayton cycle system creates a new control approach for solid fuel consumption in a three-chamber combustor. FIG. 5a illustrates this new control strategy, which provides flexible feed and finer controllability for solid fuel combustion. Fuel input (32) is operated to maintain sufficient fuel in underfire chamber (7a) independent of short term rates of combustion. Underfire air (24a) is flow controlled into underfire chamber (7a) to control the rate of energy release and, thus, the power level of the system. For a practical system, a minimum power level of about 20% or higher may also be supported by pyrolysis of fuel (32) based on external heating only with zero flow of underfire air (24a) into underfire chamber (7a). Overfire air (24b) is flow controlled into overfire chamber (7b) to maintain a peak temperature for optimum combustion. Blend air (24c) is flow controlled into blend chamber (7c) to maintain a limited maximum allowable temperature for combustion air (26). Cooled exhaust (24) represents only a portion of turbine exhaust (22) with the balance being provided as bypass air (25) not used within the system. Work output (4) provides the point of loading to provide speed control of shaft (3) which is used to control the temperature of turbine exhaust (22). External electronically controlled equipment can be used to put a load onto turbine (2) to affect the speed of shaft (3) and, in turn, affect flow rate (10) and temperature of turbine exhaust (22). Operating at a constant temperature of turbine exhaust (22) will maintain the hybrid Brayton arrangement of FIG. 5 substantially at its optimum overall efficiency throughout its turndown range. Volume flow of bypass air (25) is effectively controlled to maintain maximum limit temperature of combustion gas (26). Speed of shaft (3) is effectively controlled to maintain constant temperature of turbine exhaust (22).

Reducing the power level of the hybrid Brayton arrangement of FIG. 5 is accomplished by reducing underfire air (24a) which reduces the conversion of solid fuel to combusted and partially combusted underfire products (26a) in underfire chamber (7a). Conditions in overfire chamber (7b) will change and require a flow rate adjustment of overfire air (24b) to maintain optimum overfire combustion temperature producing overfire products (26b). Flow rate of blend air (24c) into blend chamber (7c) adjusts to maintain temperature of combustion gas (26). Since thermodynamic analysis shows that the flow of turbine exhaust (22) is greater than required flow of cooled exhaust (24) under all operating conditions then there is always sufficient flow and controllability to make immediate responses to a reduction in power level. Reducing the operating power level will decrease both the total and the relative amount of cooled exhaust (24). The absolute flow rate of cooled exhaust (24) will decrease and the percent of turbine exhaust (22) being used in combustor (7) will decrease.

Increasing the power level of the hybrid Brayton arrangement of FIG. 5 is accomplished by increasing underfire air (24a) which increases the conversion of solid fuel to combusted and partially combusted underfire products (26a) in underfire chamber (7a). Conditions in overfire chamber (7b) will change and require a flow rate adjustment of overfire air (24b) to maintain optimum overfire combustion temperature producing overfire products (26b). Flow rate of blend air (24c) into blend chamber (7c) is also adjusted to maintain temperature of combustion gas (26). Since thermodynamic analysis shows that the flow of turbine exhaust (22) is greater than required flow of cooled exhaust (24) under all operating conditions then there is always sufficient flow and controllability to make immediate responses to an increase in power level. Increasing the operating power level will increase both the total and the relative amount of cooled exhaust (24). The absolute flow rate of cooled exhaust (24) will increase and the percent of turbine exhaust (22) being used in combustor (7) will increase.

Figure 7:
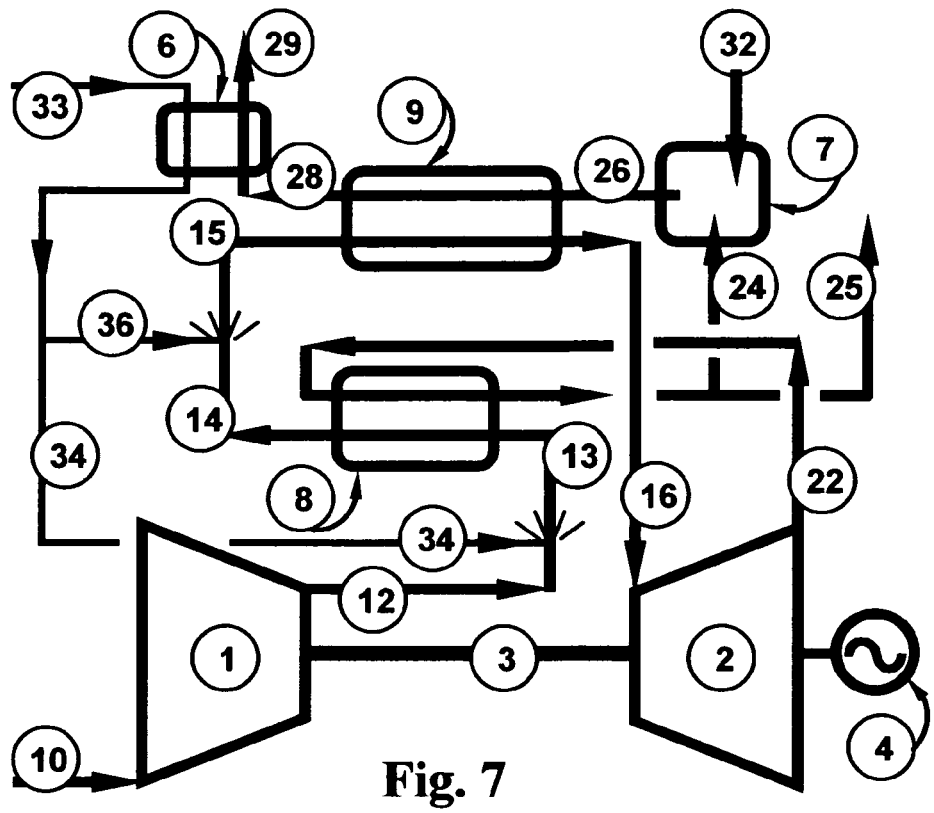
FIG. 7, "Maximized Hybrid Brayton Cycle With Dependent Heat Source", describes the flow arrangement of FIG. 5 with an added pre-heater to preheat the water injected prior to the recuperator and prior to the heater.
Figure 8:
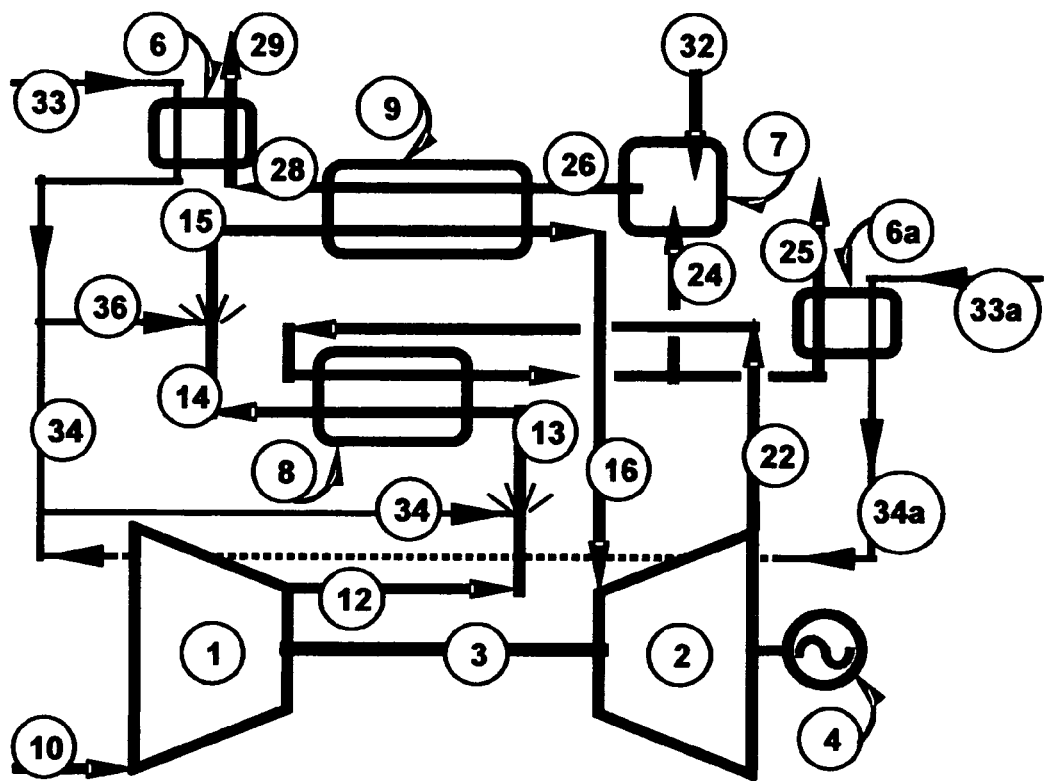
FIG. 8 shows the apparatus of FIG. 7 with a further additional pre-heater to preheat the water injected before the recuperator and before the heater.

The overall efficiency of the hybrid Brayton cycle can be increased by pre-heating spray supply (33) in spray pre-heater (6) as shown in FIG. 7 using cooled flue gas (28) or alternatively using bypass air (25) in pre-heater 6a, shown in FIG. 8 along with water supply 33a and connecting piping 34a. The apparent limit for flow of heater spray (36) and recuperator spray (34) is creating 100% humidity downstream of each spray. However systems can tolerate slightly greater than said humidity limit if the spray is not permitted to collect on surfaces before recuperator (8) or heater (9). Also, the temperature of heater spray (36) can greatly exceed the saturation temperature of recuperator fluid (14) and temperature of recuperator spray (34) can greatly exceed the saturation temperature of pressurized fluid (12). In an alternate embodiment of the present invention, steam may be injected into the mid-point of heater (9) where hot flue gas (16) is at a greater temperature than said steam to increase work output (4) of turbine (2). Added steam would enhance overall efficiency if it were created from energy taken from cooled flue gas (28) or bypass air (25) however practical systems are unlikely to have sufficient temperature in these outlet streams.

A preferred embodiment of the invention of the present patent application, shown in FIG. 7, "Maximized Hybrid Brayton Cycle With Dependent Heat Source", teaches a system with maximized operational characteristics. The arrangement of FIG. 7 has been modeled with recuperator spray (34) producing 100% humidity in cool pressurized fluid (13) and heater spray (36) producing 100% humidity in cool recuperated fluid (15). Moreover spray pre-heater (6) has been sized to heat 60° F. (15.6° C.) spray supply (33) to 240° F. (116° C.) at maximum power. Thermodynamic analysis shows that operating equipment from said example of FIG. 1 in the configuration of FIG. 7, with said common input parameters and operating at a slightly lower rotational speed of shaft (3) for best efficiency results in said comparison maximum production of 100% (equal to said example of FIG. 1) and overall efficiency about 19.3%.

Figure 7A:
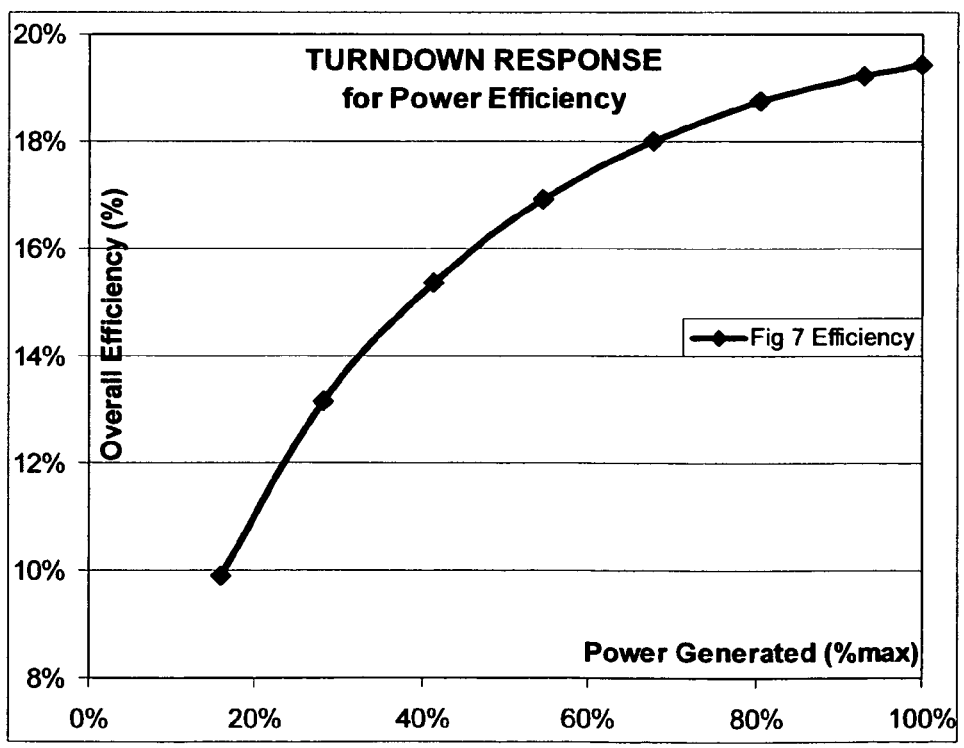
FIG. 7a is a graph of overall efficiency during turndown of the arrangement of FIG. 7.
Figure 7B:
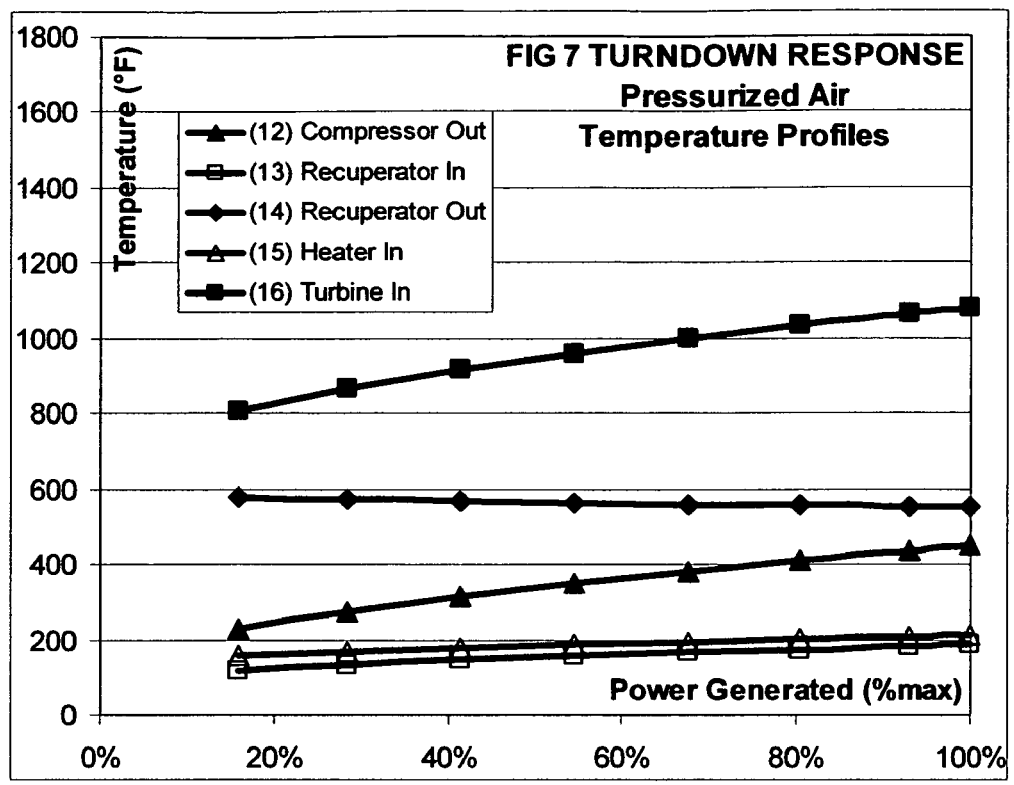
FIG. 7b is a graph of temperatures during turndown of flow in the pressurized section of the arrangement of FIG. 7.
Figure 7C:
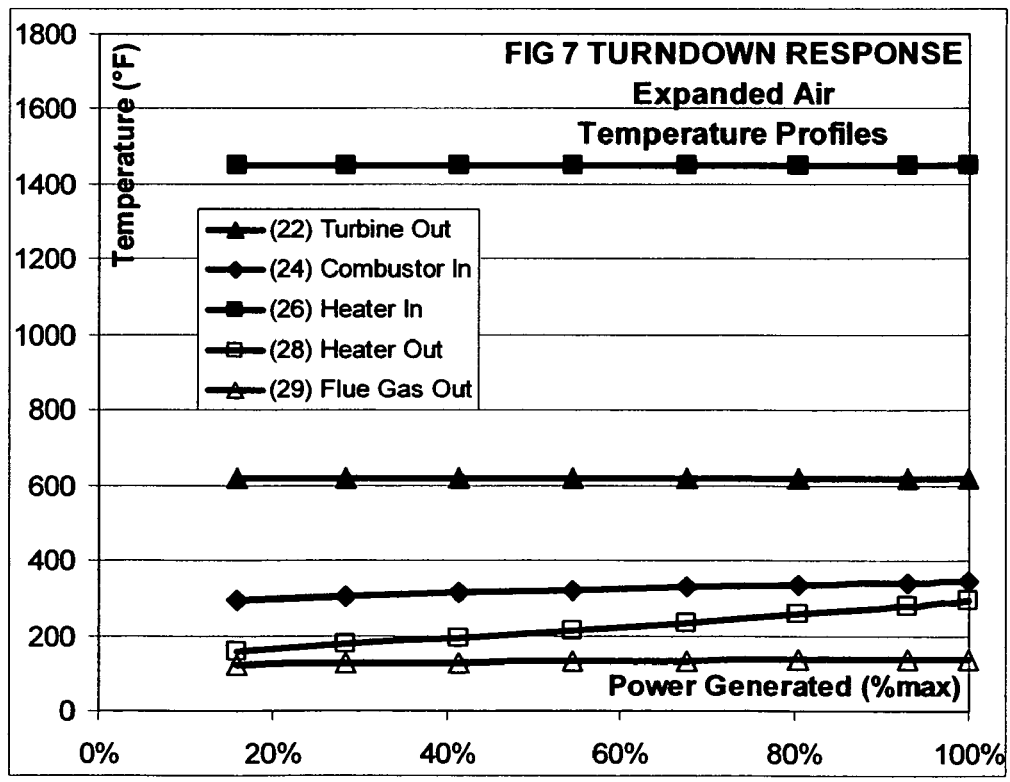
FIG. 7c is a graph of temperatures during turndown of flow in the expanded air section of the arrangement of FIG. 7.

FIG. 7a is a graph of overall efficiency during turndown of the arrangement of FIG. 7 and indicates an efficiency response curve for hybrid Brayton systems that reflects a similar shape as would be expected for internally-heated Brayton systems. FIG. 7b is a graph of temperatures during turndown of flow in the pressurized section before turbine (2) of the arrangement of FIG. 7 and teaches that the maximum turbine inlet temperature (16) is below 1120° F. (605° C.) which greatly reduces stress on the turbine impeller as compared to said example of FIG. 1 with a turbine inlet temperature (16) of about 1650° F. (900° C.). The relatively cool and almost constant temperatures at recuperator inlet (13) and heater inlet (15) imply that maximum energy will be transferred. FIG. 7c is a graph of temperatures during turndown of flow in the expanded air section after turbine (2) of the arrangement of FIG. 7 and records that temperature of combustion gas (26) is constant at 1450° F. (788° C.) and the temperature at turbine out (22) is constant at 675° F. (357° C.) as these are controlled variables. Flue gas out (29) is relatively constant and is slightly below its dew point such that some latent heat of water vapor has been transferred to spray supply (33).

The above disclosure described the use of the present invention in one application: use of waste solid fuel for electric power generation, with concomitant production of heated exhaust air which could be used externally for space heating or similar purposes. It will be apparent to one skilled in the art that the invention is applicable to other power production applications, and the present invention contemplates the use in such other applications.

While the above disclosure describes improved Brayton cycle systems comprising combustion of solid fuel, the advantages resulting from the innovative systems disclosed here would be equally realized in liquid or gas fueled systems, with suitable adaptation of combustion chamber (7), and such use and adaptation is contemplated herein. Adaptation of combustion chamber (7) for alternate fuels would be well within the purview of one skilled in the art.

Other embodiments will be apparent to one skilled in the art, which will change various details of the present invention without limiting its scope. Furthermore, the foregoing description of the preferred embodiment of the invention and the best mode for practicing the invention are provided for the purpose of illustration only and not for the purpose of limitation of the invention, which will be defined by the claims appended hereto.

The invention claimed is:

1. A method of extracting heat from a hot gas to generate electricity using atmospheric air as a working fluid, comprising the steps of:

directing atmospheric air, to be used as working fluid, to the inlet of a compressor;
pressuring said gaseous working fluid in said compressor;
lowering the temperature by evaporative cooling, and increasing the volume, of said working fluid by spraying water into said working fluid;
heating said working fluid with added water in a recuperator;
lowering the temperature by evaporative cooling, and further increasing the volume of, said working fluid which has been heated in said recuperator by spraying water into said working fluid;
heating said working fluid which has been heated in said recuperator and into which water has been added following said heating in said recuperator in a heater, said heater comprising a heat exchanger using said hot gas that supplies heat to said working fluid and arranged in counter-flow to said working fluid;
wherein said hot gas is generated by combustion of a solid fuel in a three-chambered combustor, using a portion of said low-pressure working fluid with added vaporized water emerging from said recuperator to supply heat and/or combustion air to each chamber of said three-chambered combustor;
adding solid fuel to a first chamber of said three-chambered combustor;
adjusting the amount of said portion of low-pressure working fluid introduced into said first chamber in accordance with the energy output demands of the system, and at least partially combusting or pyrolizing said solid fuel;
conducting the partially combusted gaseous products from said first chamber into the second chamber of said three-chambered combustor;
adjusting the amount of said portion of low-pressure working fluid introduced into said second chamber to maintain an optimum temperature of combustion;
conducting the combustion products from said second chamber into the third chamber of said three-chambered combustor;
adjusting the amount of said portion of low-pressure working fluid introduced into said third chamber to maintain the maximum allowable temperature consistent with equipment specification;
expanding said working fluid which has been heated in said heater by combustion of a solid fuel in said three-chambered combustor by expansion through a turbine, and using the work of said turbine to generate electricity;
cooling the low-pressure working fluid emerging from said turbine in said recuperator, which is arranged in counter-flow to said high-pressure working fluid from said compressor;
releasing said working fluid with added vaporized water to the atmosphere.

2. The method as recited in claim 1, wherein the portion of said low-pressure working fluid with added vaporized water emerging from said recuperator not used in said three chamber combustion process supplies heat and clean air for external space heating, water heating or combustion air.

3. The method as recited in claim 1, wherein said hot gas emerging from said heater supplies heat to a heat exchanger for indirect heating of water or air.

4. The method as recited in claim 3, wherein said spray water is heated by hot gas emerging from said heater before being sprayed into said working fluid.

5. The method of claim 1 wherein said hot gas is generated by combustion of liquid or gaseous fuel.

6. An apparatus for converting heat to electricity, using atmospheric air as working fluid comprising:
- a compressor for pressurizing said working fluid;
- a first water spray to introduce water into said pressurized working fluid;
- a recuperator to heat said pressurized working fluid with added vaporized water from said first water spray using heat from low-pressure working fluid leaving a turbine, such recuperator arranged in counter-flow with said working fluid leaving a turbine;
- a second water spray to introduce water into said pressurized recuperated working fluid;
- a connection for conveying said pressurized recuperated working fluid with added vaporized water from said first water spray and said second water spray to a heater;
- a heater to heat said pressurized recuperated working fluid with added vaporized water from said first water spray and from said second water spray using an external hot gas;
- wherein the source of said external hot gas comprises a solid fuel combustor comprising three interconnected chambers, in which:
- a first chamber in communication with a solid fuel;
- said first chamber connected to an adjustable amount of low-pressure working fluid emerging from said recuperator;
- a second chamber connected so as to receive partially combusted gases from said first chamber;
- said second chamber connected to an adjustable amount of low-pressure working fluid emerging from said recuperator;
- a third chamber connected so as to receive combustion products from said second chamber;
- said third chamber connected to an adjustable amount of low-pressure working fluid emerging from said recuperator;
- a turbine for expanding said pressurized recuperated working fluid with added vaporized water from said first water spray and from said second water spray, which has been heated in said heater, to a low-pressure working fluid;
- an electrical generator coupled to said turbine; and
- a connection for conveying said low-pressure working fluid emerging from said turbine to said recuperator, which is arranged in counter-flow to said pressurized working fluid from said compressor.

7. The apparatus as claimed in claim 6 further comprising a pre-heater using heat from said hot gas emerging from said heater to increase the temperature of water feeding said first water spray and said second water spray.

8. The apparatus as claimed in claim 6 further comprising a pre-heater using heat from said hot gas emerging from said heater to increase the temperature of water feeding said first water spray and said second water spray.

9. The apparatus as claimed in claim 6 further comprising a pre-heater using heat from said low-pressure working fluid emerging from said recuperator to increase the temperature of water feeding said first water spray and said second water spray.

10. The apparatus as claimed in claim 8 further comprising a pre-heater using heat from said low-pressure working fluid emerging from said recuperator which is not used in said three chamber combustor to increase the temperature of water feeding said first water spray and said second water spray.

11. The apparatus as claimed in claim 6 wherein the source of said external hot gas comprises a combustor for the combustion of solid, liquid or gaseous fuel.

\* \* \* \* \*